United States Patent [19]
Loza

[11] 3,977,546
[45] Aug. 31, 1976

[54] WRECKING AND HAULING TRUCK
[76] Inventor: Richard Loza, 289 Twin View Drive, Pleasant Hill, Calif. 94523
[22] Filed: Nov. 7, 1974
[21] Appl. No.: 521,645

[52] U.S. Cl. .............................. 214/86 A; 212/8 R
[51] Int. Cl.² ........................................... B60P 3/12
[58] Field of Search .................. 214/86 A; 280/402; 254/139.1; 212/8 R

[56] References Cited
UNITED STATES PATENTS

| | | | |
|---|---|---|---|
| 2,283,443 | 5/1942 | Klein | 214/86 A X |
| 2,509,435 | 5/1950 | Huttinger | 214/86 A |
| 2,551,745 | 5/1951 | Hutchings | 214/86 A |
| 2,603,370 | 7/1952 | Hanzel | 214/86 A |
| 2,625,279 | 1/1953 | Dalby et al. | 214/86 A |
| 2,951,601 | 9/1960 | Castoe | 214/86 A |
| 3,348,809 | 10/1967 | Lardner | 214/86 A X |

Primary Examiner—Albert J. Makay
Attorney, Agent, or Firm—Phillips, Moore, Weissenberger, Lempio & Strabala

[57] ABSTRACT

A truck body unit configured for wrecking and/or hauling operations includes a fabricated body unit having a structural framework suitable for connection to a chassis frame with a flat bed generally configured for hauling operations, a boom being pivotably connected with the structural framework adjacent a rearward end of the body unit for movement between a lowered position in general alignment with the bed and an erect position with a rearward end of the boom extending past and above the rearward end of the flat bed. The boom is adapted for supporting a load to be towed with a motor being operatively interconnected between the boom and the structural framework for raising and lowering the boom. Although the boom is particularly contemplated for raising a load by operation of the interconnecting motor means, a separate winch unit may also be provided for increased operating versatility of the truck.

4 Claims, 7 Drawing Figures

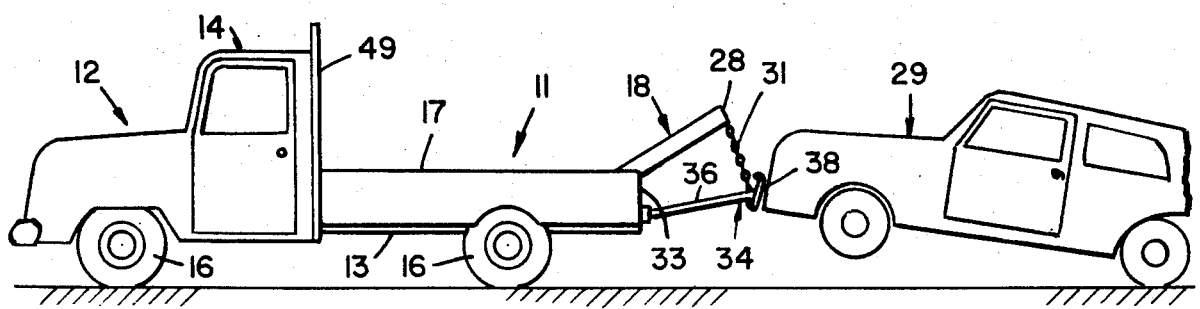
FIG_1
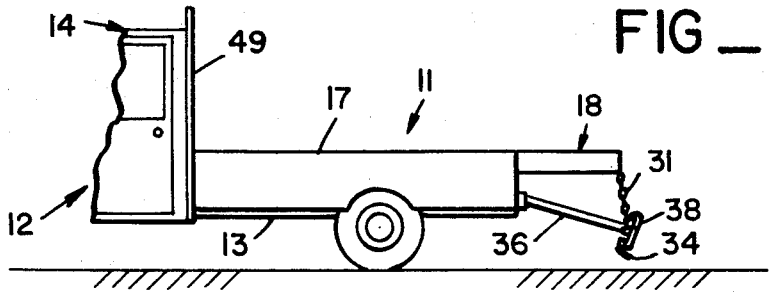
FIG_2
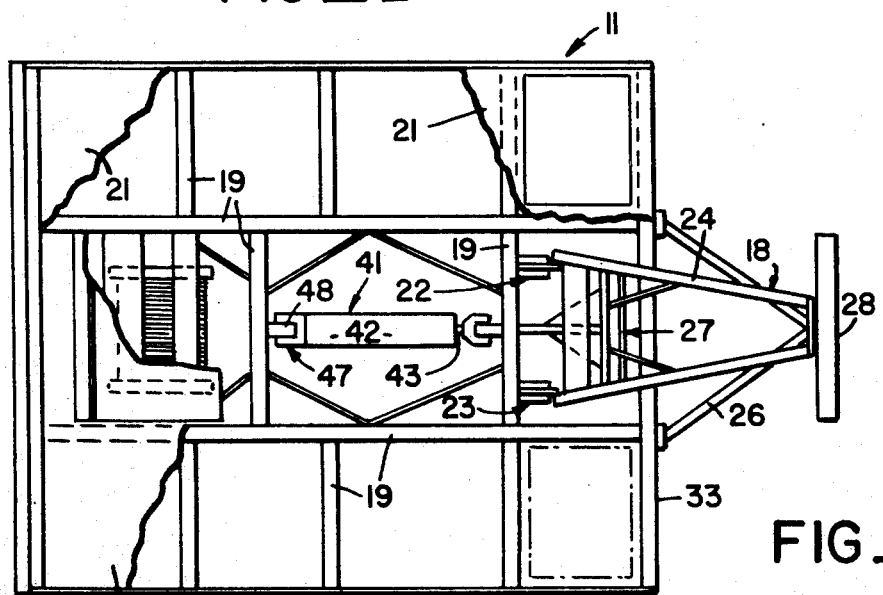
FIG_3
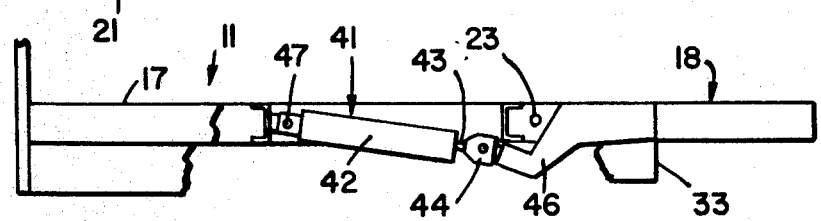
FIG_4
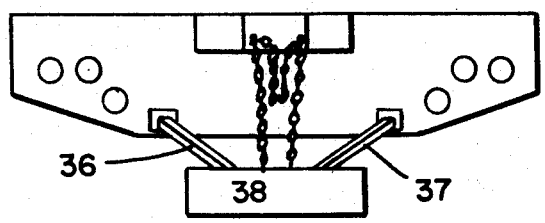
FIG_5

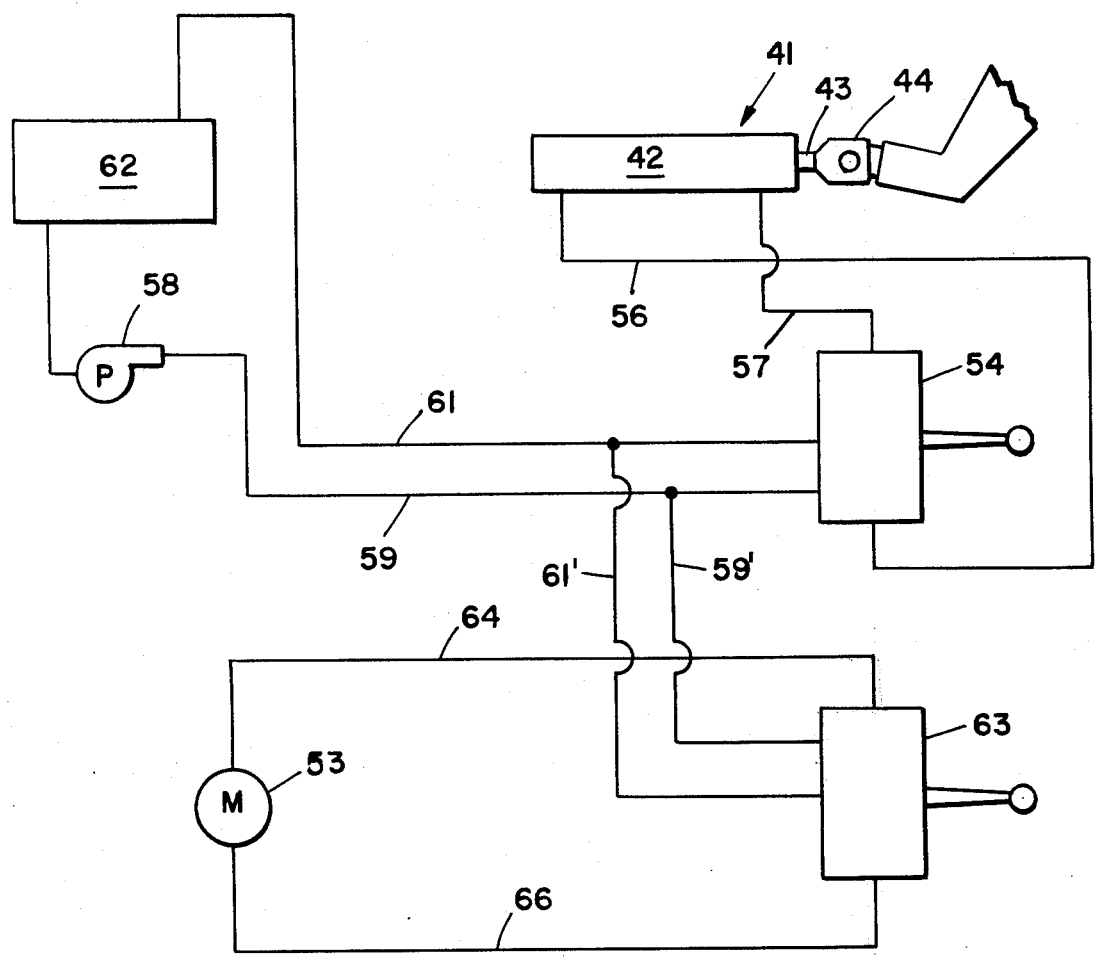
FIG_6
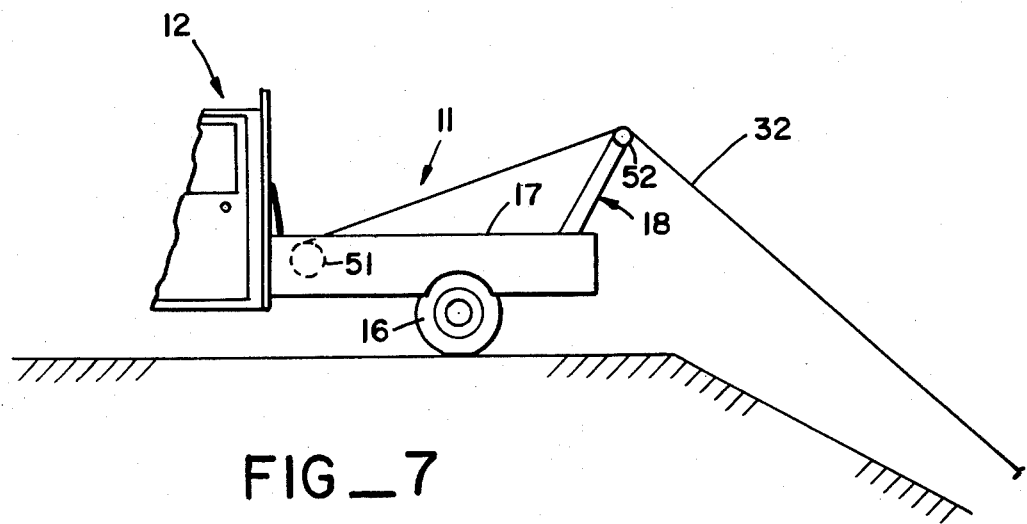
FIG_7

WRECKING AND HAULING TRUCK

BACKGROUND OF THE INVENTION

The present invention relates to a wrecking truck or vehicle and more particularly to such a vehicle which is configured for wrecking and/or hauling operations. The invention particularly contemplates a truck or vehicle having a boom which is movable between a lowered position and an erect position in order to provide numerous advantages which are described in greater detail below.

Most wrecking trucks presently in use include a fixed crane arrangement with a boom supported in upwardly and rearwardly extending relation from the truck bed by a rigid combination of angled braces. A fixed crane arrangement of this type tends to encompass most of the truck bed and accordingly, tends to limit the truck to wrecking operations. It has also been found that the fixed crane arrangement tends to limit operating versatility of the truck or vehicle even during wrecking and/or towing operation.

SUMMARY OF THE INVENTION

Accordingly, it is a primary object of the present invention to provide a bed or body unit suitable for mounting upon a truck or vehicular chassis while being configured for wrecking and/or hauling operations.

It is a further object of the invention to provide a vehicular body unit having a boom movable between a lowered position and an erect position for wrecking or towing operations.

It is a still further object of the invention to provide such a body unit including a movable boom together with motor means for raising the boom toward its erect position and simultaneously raising a load supported by the boom.

It is another object of the invention to provide such a body unit with a movable boom and further including a winch unit connected to towing cable means which may be trained over an extended end of the boom.

It is yet another object of the invention to provide such a body unit having a flat bed with a boom being movable between a lowered position where the boom substantially forms a continuation of the flat bed and an erect position suitable for wrecking or towing operations.

It is an even further object of the invention to provide such a body unit including a pivotable boom with an angled portion of the boom extending away from a longitudinal plane of the boom, an extendable and retractable motor means being interconnected between a bracket provided by the angled boom portion and a second bracket upon the body.

It is also an object of the invention to provide a truck or vehicle including a body unit suitable for accomplishing one or more of the objects set forth above.

Additional objects and advantages of the present invention are made apparent in the following description having reference to the accompanying drawings.

BRIEF DESCRIPTION OF THE DRAWINGS

FIG. 1 is a side view in elevation of a wrecking truck having a body configured in accordance with the present invention and including a movable boom illustrated in a raised or erect position.

FIG. 2 is a fragmentary view of the truck similar to FIG. 1 while illustrating the boom in a lowered position.

FIG. 3 is a top view, with parts broken away, of the body unit of FIGS. 1 and 2.

FIG. 4 illustrates a preferred manner in which the movable boom in interconnected with support structure of the body by an extendable and retractable motor such as a hydraulic jack.

FIG. 5 is an end view of the body unit taken for example from the right end of FIG. 2.

FIG. 6 is a schematic representation of a control circuit for a motor means such as the hydraulic jack of FIG. 4 and an additional motor employable for example to operate a winch which is usable in conjunction with the movable boom.

FIG. 7 illustrates an alternate embodiment or additional operating capability for the truck of FIG. 1 wherein a winch unit is connected to a towing cable trained over the extended end of the boom.

DESCRIPTION OF THE PREFERRED EMBODIMENT

The present invention particularly contemplates a bed or body unit, as generally indicated at 11 in FIGS. 1–3, for use in conjunction with a conventional truck or vehicle indicated at 12. The truck chassis 12 includes longitudinally extending frame members 13 arranged at one end of the vehicle for receiving the body unit 11. The forward end of the vehicle includes a cab assembly 14 housing a conventional operator station (not otherwise shown). A plurality of wheels are also carried by the chassis as generally indicated at 16.

The present invention particularly contemplates configuration of the body unit 11 to adapt a conventional truck or vehicle chassis 11 for hauling and/or wrecking type operations as well as to provide a wrecking or towing truck of improved capability. Accordingly, the body unit 11 is formed with a generally flat bed surface indicated at 17 which is suitable for receiving a load to be hauled or carried by the truck. In keeping with the basic identity of the vehicle as a wrecking truck, the load carried upon the flat surface 17 might comprise a wrecked vehicle or vehicle components which could not be satisfactorily towed by the truck.

An essential feature of the body unit 11 which adapts the truck for wrecking or towing operations is a boom 18. The boom is adjustably secured to the bed 11 for movement between a lowered position illustrated in FIG. 2 and an erect or raised position illustrated in FIG. 1.

As is more clearly illustrated in FIG. 2, the body unit 11 is fabricated with a structural framework comprising interconnected beams indicated at 19. A substantial portion of the framework is covered by plate material, as indicated at 21, to form the flat bed surface 17. The boom 18 is movably secured relative to one of the structural beams 19 by pivotable connections indicated in FIG. 3 at 22 and 23. The boom 18 is also fabricated from a pair of longitudinally extending beams 24 and 26 and suitable cross pieces 27. An end piece 28 is also interconnected between the ends of the beams 24 and 26.

A suitable towing means is disposed upon the extended end of the boom to support a load such as the automobile indicated at 29 in FIG. 1. The towing means may comprise a tethering chain as indicated at 31 in FIGS. 1 and 2 for connection with the vehicle. Alternatively, the towing means may also comprise a conventional towing cable of the type indicated at 32 in FIG. 7. The configuration of FIG. 7 is particularly contemplated for equipping the truck to tow or retrieve loads which the truck cannot closely approach. Other details of the FIG. 7 embodiment are discussed in greater detail below.

Returning to the configuration of FIGS. 1-3, the rearward end 28 of the boom 18 extends past a rearward end 33 of the mian body unit 11. The boom 18 is of relatively short length particularly in comparison with the booms of conventional wrecking trucks, the pivotable connections 22 and 23 for the boom being arranged only a limited distance forwardly of the rearward end 33 of the body or bed. This feature has two principle advantages within the present configuration. Initially, the arrangement of the pivotable connections 22 and 23 adjacent the rearward end 33 of the bed permits the flat bed surface 17 to extend across substantially the entire expanse of the body unit even when the boom 18 is in the erect position illustrated in FIG. 1. Accordingly, the flat bed configuration of the truck is available for hauling even when the vehicle is also being used in wrecking or towing operations.

The relatively short length of the boom 18, which is permitted by the novel configuration of the present invention, also permits a load such as the vehicle 29 to be supported with a reduced moment arm being formed about the rear axle of the truck 12. This of course enables the truck to carry an increased load upon its boom 18. For example, in a conventional wrecking truck, the boom would necessarily extend rearwardly of the bed to approximately the same degree as illustrated in FIG. 1 in order to permit proper connection with the load or vehicle to be towed. However, in such a conventional wrecking truck configuration, the rearward end of the boom would also be substantially higher from the truck bed than the end 28 of the boom in FIG. 1. Accordingly, it may be seen that the present invention permits a supported load, such as that of the vehicle 29, to be carried closer to the rear axle of the vehicle and accordingly allows the vehicle 12 to carry an increased load relative to its own weight and size through use of the present invention.

The body unit 11 also includes a stabilizer assembly 34 extending rearwardly from the body unit 11 to control the position of the vehicle 29 while it is supported upon the boom 18 and being towed by the truck 12. The stabilizer unit 34 preferably includes a pair of arms 36 and 37 which are pivotably mounted at the rearward end 33 of the body unit and extend toward each other to support a bumper plate 38. Preferably, the towing chain 31 is passed beneath the bumper plate 38 and then connected to a frame member (not shown) of the vehicle 29 in conventional fashion in order to snub the vehicle against the bumper plate 38.

When the truck 12 is not being used for wrecking or towing operations, the boom 18 is preferably lowered into a position where it forms a generally continuous extension of the flat surface 17 in order to further facilitate use of the truck for hauling various materials upon the flat surface 17 of the body unit.

A preferred motor arrangement for controlling movement of the boom between the lowered position of FIG. 2 and the erect position of FIG. 1 is further illustrated in FIGS. 4 and 5. The motor means for operating the boom 18 preferably comprises a doubleacting hydraulic jack of the type shown at 41. The jack 41 includes a cylinder 42 having an extendable and retractable rod portion 43. The rod 43 is pivotably connected at 44 to a bracket 46 which is effectively formed by an offset or angled portion of the boom. Preferably, the offset bracket 46 extends forwardly and downwardly relative to the main longitudinal plane of the boom 18 in order to facilitate operation of the boom by the jack 41 even when the boom 18 is in its lowered position. The offset bracket 46 further permits the jack 41 to remain in generally close parallel alignment with the bed 17 of the body unit as the boom 18 is moved between its lowered and erect positions. The cylinder 42 is of course pivotably connected to a second bracket 48 mounted upon another of the support structure elements 19 within the body unit 11.

The body unit 11 is preferably contemplated as a self-contained unit capable of mounting upon a conventional truck or vehicle chassis in order to permit its immediate use in wrecking and/or hauling operations. The body unit 11 also includes an upright section 49 formed at the forward end of the bed surface 17 in order to protect the cab 14 from a load being carried upon the bed surface 17.

In order to further adapt the body unit 11 as an integral unit for use upon a conventional chassis, it is also contemplated that manual controls for the motor 41 also be included within the body unit. The arrangement of such manual controls is illustrated in FIG. 6.

Before describing the control circuit arrangement, reference is first made to FIG. 7 in order to describe the alternate capability set forth therein. As indicated above, it is preferably contemplated that a vehicle or load to be towed by the truck 12 is initially connected to the boom 18 by means of the chain 31 illustrated in FIGS. 1 and 2. After the chain 31 is connected to the load, with the boom in its lowered position as illustrated in FIG. 2, the hydraulic jack 41 is then operated in extension (also see FIGS. 3 and 4) so that the boom is moved toward its erect position and the load or vehicle 29 is simultaneously raised into a suitable position for towing.

This feature simplifies the structure of the body unit 11 and further increases versatility of the truck 12 in towing operations. For example, with the boom 18 in its lowered position, the truck 12 may enter relatively inaccessible areas such as a garage or storage area having low headroom. A load such as the vehicle 29 may be connected to the towing chain 31 with the boom 18 in its lowered position. The vehicle may then be drawn out of the relatively inaccessible area with the boom either in its lowered position or slightly raised toward its erect position illustrated in FIG. 1. After the vehicle 29 is drawn out of the relatively inaccessible area, the boom 18 and the forward end of the vehicle 29 may then be elevated to the fully erect position illustrated in FIG. 1

The body unit 11 also includes a conventional winch unit as indicated at 51 in FIG. 7 to provide even more versatility in the truck. Preferably, the winch unit 51 is mounted beneath the flat bed surface 17 of the body units so that the full area of the bed remains available for carrying a load. When it is desirable to use the winch unit, the towing cable 32 which is conventionally connected to the winch is trained over a sheave or pulley 52 rotatably mounted at the rearward end of the boom 18. The towing cable may then be extended further and connected to a load which cannot be closely approached by the truck 12. For example, the towing cable 32 would be particularly useful in towing or pulling vehicles out of ditches or other areas which could not be traversed by the truck. Here again, it would be possible to operate the winch unit 51 with the boom 18 arranged anywhere between its lowered position illustrated in FIG. 2 and its fully erect position illustrated in FIG. 1.

Referring again to FIG. 6, the manual control circuit disclosed therein is contemplated for operating the motor or jack 41 as well as for operating an additional hydraulic motor 53 adapted for driving the winch unit 51. A portion of the control circuit for operating the jack 41 includes a manually operable valve 54 connected with the head and rod ends of the cylinder 42 by means of conduits 56 and 57 respectively. The manually operable valve is also in communication with a pump of source of hydraulic fluid under pressure 58 by the means of a conduit 59. Another conduit 61 communicates the manually operable valve 54 with a hydraulic fluid reservoir or sump 62. In operation, the pump 58 draws fluid from the reservoir 62 for supply to the valve 54 through the conduit 59.

In order to operate the additional motor 53, branch conduits 59' and 61' are in similar communication with a second manually operable valve 63. The manually operable valve 63 is in communication with the hydraulic motor 53 through opposed conduits 64 and 66.

Within the above arrangement, the manually operable valve 54 may be shifted from a neutral hold position in one direction to direct fluid under pressure through the conduit 56 to the head of the cylinder 42. This of course causes extension of the rod 43 and moves the boom 18 toward its erect position (also see FIGS. 1, 2 and 4). At the same time, the rod end of the cylinder is in communication with the reservoir 62 through the conduit 57, the valve 54 and the other circuit 61.

In order to lower the boom 18, the manually operable valve 54 may be shifted into a second position where fluid under pressure is communicated through the other conduit 57 to the rod end of the cylinder 42 which results in retraction of the rod 43. A drain path is then provided for the head end of the cylinder 42 through the conduit 56, the valve 54 and the conduit 61.

The other manually controlled valve 63 is similarly operable to regulate the motor 53 during operation of the winch unit 51. The manually operable valve 63 has at least a first operative position where the motor tends to drive the winch unit in counter-clockwise rotation, as viewed in FIG. 7, in order to reel in the towing cable 32 and draw a load toward the truck 12. The control valve 63 may also be provided with a conventional "reeling-out" position permitting the towing cable 32 to be unreeled or drawn out from the truck for connection to a load (not shown in FIG. 7).

The control circuit illustrated in FIG. 6 may be completely a unitary portion of the body unit 11. For example, the pump 58 could be electrically operable with an electrical conduit switchable for connection to the generator or battery of the truck 12. On the other hand, the pump 58 and reservoir 62 could also be conventional portions of a prime mover (not otherwise shown) for the truck 12. In that event, suitable couplings could be provided along the conduits 61 and 59 to permit the remaining portions of the circuit to be integral within the body unit 11 and to permit rapid interconnection with the pump 58 and reservoir 62.

I claim:
1. A truck suitable for hauling and/or for wrecking operations, comprising
   a chassis including frame means at one end and an operator's cab at the other end,
   a fabricated body unit including structural framework connected to the frame means, a flat bed horizontally supported by the structural framework and an upright bed portion arranged transversely of the truck adjacent the cab, the flat bed forming a centrally disposed recess adjacent a rearward end of the flat bed,
   a boom pivotably connected with the structural framework adjacent the recess in the flat bed, the boom being movable between a lowered position in longitudinal alignment with the recess formed by the flat bed and an erect position with a rearward end of the boom extending past and above the rearward end of the flat bed,
   the forward position of the boom extending in offset relation from a longitudinal plane of the boom to form a first mounting bracket, said forward portion of the boom extending forwardly, downwardly and upwardly relative to the longitudinal plane of the boom,
   a second mounting bracket being formed by the structural framework generally in longitudinal alignment with the boom in the lowered position,
   towing means arranged upon the rearward end of the boom for supporting a load,
   motor means being interconnected between the first and second mounting brackets, said boom being mounted for movement at a pivot located rearwardly of the second mounting bracket and adjacent the first mounting bracket,
   control means for operating the motor means and selectively moving the boom between its lowered and erect positions.

2. The truck of claim 1 further comprising stabilizer means extending rearwardly from the flat bed beneath the boom for ineraction with a load supported by the towing means on the boom.

3. The truck of claim 1 further comprising a winch unit arranged upon the body unit, the towing means including a sheave rotatably arranged upon the rearward end of the boom with a towing cable being trained over the sheave and extending forwardly for connection with the winch unit.

4. The truck of claim 1 wherein the motor means is a hydraulic jack, the control means including a manually operable valve means arranged upon the body unit in communication with the hydraulic jack, conduit means providing communication between the valve means and a source of fluid under pressure.

* * * * *

UNITED STATES PATENT AND TRADEMARK OFFICE
CERTIFICATE OF CORRECTION

PATENT NO. : 3,977,546

DATED : August 31, 1976

INVENTOR(S) : Richard Loza

It is certified that error appears in the above—identified patent and that said Letters Patent are hereby corrected as shown below:

Column 2, line 7 - "in" should read --is--.

Column 4, line 60 - "units" should read --unit--.

Column 5, line 16 - "of" first occurrence should read --or--.

Column 6, claim 1, line 26 - "position" should read --portion--

Signed and Sealed this

Seventh Day of December 1976

[SEAL]

Attest:

RUTH C. MASON
Attesting Officer

C. MARSHALL DANN
Commissioner of Patents and Trademarks